Dec. 20, 1966 A. SHOH 3,293,456

ULTRASONIC CLEANING APPARATUS

Filed March 18, 1963 2 Sheets-Sheet 1

INVENTOR.
ANDREW SHOH
BY Blair & Buckles
ATTORNEYS

ULTRASONIC CLEANING APPARATUS

Filed March 18, 1963 2 Sheets-Sheet 2

INVENTOR.
ANDREW SHOH
BY Blair & Buckles
ATTORNEYS

United States Patent Office
3,293,456
Patented Dec. 20, 1966

3,293,456
ULTRASONIC CLEANING APPARATUS

Andrew Shoh, Stamford, Conn., assignor, by mesne assignments, to Branson Instruments, Incorporated, Stamford, Conn., a corporation of Delaware Filed Mar. 18, 1963, Ser. No. 265,751
18 Claims. (Cl. 310—8.1)

This invention relates to ultrasonic cleaning apparatus, more particularly it relates to apparatus for automatically tuning the frequency at which an electromechanical transducer radiates ultrasonic energy into a load of varying electrical impedance for the purpose of continuously obtaining high electromechanical conversion efficiency in the tranducer.

In general, the invention provides novel apparatus for producing an electrical signal corresponding in phase and amplitude to the load-varying component of the electrical impedance of a loaded electromechanical transducer. The invention also provides a novel automatically tuned feedback oscillator incorporating and exciting an electromechanical transducer having a varying load. The oscillator utilizes the load-varying component of the loaded transducer's electrical impedance to derive a feedback signal. The feedback signal automatically tunes the oscillator to the frequency at which the loaded transducer delivers maximum energy to the load. This operation generally occurs close to the frequency at which the loaded transducer has high electromechanical conversion efficiency.

The invention is described with reference to ultrasonic cleaning. However, the invention is applicable to other ultrasonic processes and systems and to electromechanical transducer systems in general. Moreover, the invention is not limited to ultrasonic frequencies, but is suited for use over the entire range of frequencies over which electromechanical transducers are operable.

In an ultrasonic cleaning system, the articles or materials to be cleaned are generaly disposed in a tank containing a liquid, generally a solvent such as water. Ultrasonic transducers are mounted on the tank. The transducers are excited from an electrical source of alternating voltage and radiate ultrasonic energy into the liquid. The ultrasonic energy in the liquid causes cavitation at the surfaces of the articles in the tank, thereby cleaning them.

The loaded transducer, including the tank, the liquid and the articles being cleaned, appears electrically as a damped resonant circuit having one or more resonant frequencies. The resonant frequencies are not fixed but vary with the amount of liquid in the tank, the number of articles and their position in the tank, and the amount of gas in the liquid.

In the frequency range of high electromechanical energy efficiency i.e., at resonance, the loaded transducer can be represented by an equivalent electrical circuit comprising two parallel paths, one including a load-invariant impedance, and the other including a load-varying impedance. That is, the impedance of the load-invariant path does not vary, for example, with the amount of liquid or number of articles in the cleaning tank. The load-varying impedance component, however, varies markedly with these and any other changes in the transducer load.

High ultrasonic cleaning efficiency, generally attained with high electromechanical conversion efficiency, is achieved when the loaded transducer is energized at the frequency associated with the principal or primary resonance of its load-varying component of impedance. However, operation at a single fixed frequency is generally not satisfactory because as the transducer load varies, the frequency of the principal resonance varies. It is therefore desirable to change (tune) the frequency of the electrical excitation applied to the transducer so that the transducer will always be operating at the principal resonance.

Such an ultrasonic system will continuously operate at high efficiency. Although the invention is described as providing high efficiency cleaning and electromechanical conversion, it is believed that in many cases the maximum efficiency is attained.

In some prior art ultrasonic cleaning systems, the frequency of transducer excitation is manually tuned. In such systems high cleaning efficiency requires a costly operator to continuously tune the excitation frequency to that of the instantaneous principal transducer resonance. Moreover, the manual tuning lags behind the changes in the load, impairing the cleaning efficiency.

In other prior art ultrasonic systems the transducer is energized with an alternating voltage whose frequency is continuously changed or swept back and forth over a range sufficiently broad to include the various frequencies at which high cleaning efficiency is achieved as the load conditions vary. A principal disadvantage of such a swept frequency system is that it achieves high cleaning for only a brief instant in each sweep cycle. During the remainder of the sweep cycle the transducer is relatively inefficient.

Another technique for automatically tuning the frequency at which the transducer is energized employs additional transducers for monitoring the ultrasonic energy radiated into the cleaning tank. However, such additional sensing transducers are costly and do not always monitor the same conditions that are affecting the radiating transducer.

Accordingly, it is an object of the invention to provide apparatus for automatically producing an electrical signal corresponding to the instantaneous value of the load-varying electrical impedance of an electromechanical transducer.

Another object of the invention is to provide automatic apparatus for producing an electrical signal corresponding to the portion of the electrical excitation delivered to the load-varying electrical impedance of a piezoelectric transducer radiating ultrasonic energy into a varying load.

A further object of the invention is to provide apparatus of the above character for exciting an electromechanical transducer to radiate ultrasonic energy.

Another object of the invention is to provide apparatus for automatically tuning the frequency at which an electromechanical transducer is excited.

A further object is to provide apparatus of the above character for automatically tuning the excitation frequency supplied to an ultrasonic transducer radiating into a cleaning tank to achieve high cleaning efficiency.

Another object is to provide such apparatus for automatically tuning the transducer exciting frequency to radiate maximum energy into the transducer load.

Still another object of the invention is to provide apparatus of the above character further characterized by low cost and simple operation.

Other objects of the invention will in part be obvious and will in part appear hereinafter.

The invention accordingly comprises the features of construction, combinations of elements, and arrangements of parts which will be exemplified in the constructions hereinafter set forth, and the scope of the invention will be indicated in the claims.

For a fuller understanding of the nature and objects of the invention, reference should be had to the following detailed description taken in connection with the accompanying drawings, in which.

In general, the invention provides an electrical circuit for deriving from a loaded ultrasonic transducer a feedback signal that corresponds to the electriacl excitation delivered to the load-varying electrical impedance of the transducer. To obtain such a signal, the circuit develops a compensating electrical signal corresponding to the excitation delivered to the transducer's load-invariant electrical impedance. The compensating signal is combined with a second electrical signal corresponding to the total transducer excitation to cancel the portion of the second signal produced by the transducer's load-invariant electrical impedance. The remainder of the second signal, the desired feedback signal, is a measure of the load-varying transducer impedance.

In the tuned source provided by the invention, the feedback signal obtained in the above manner is applied to the input of an amplifier exciting the transducer. The source then operates as a regenerative feedback oscillator driving the transducer at the frequency of high electromechanical conversion efficiency.

When the source of the present invention excites a transducer radiating into a cleaning tank, the frequency at which the source oscillates is automatically and instantaneously tuned by the feedback signal to achieve high cleaning efficiency according to the instantaneous value of the transducer's varying load.

Figures 1, 2, 3:
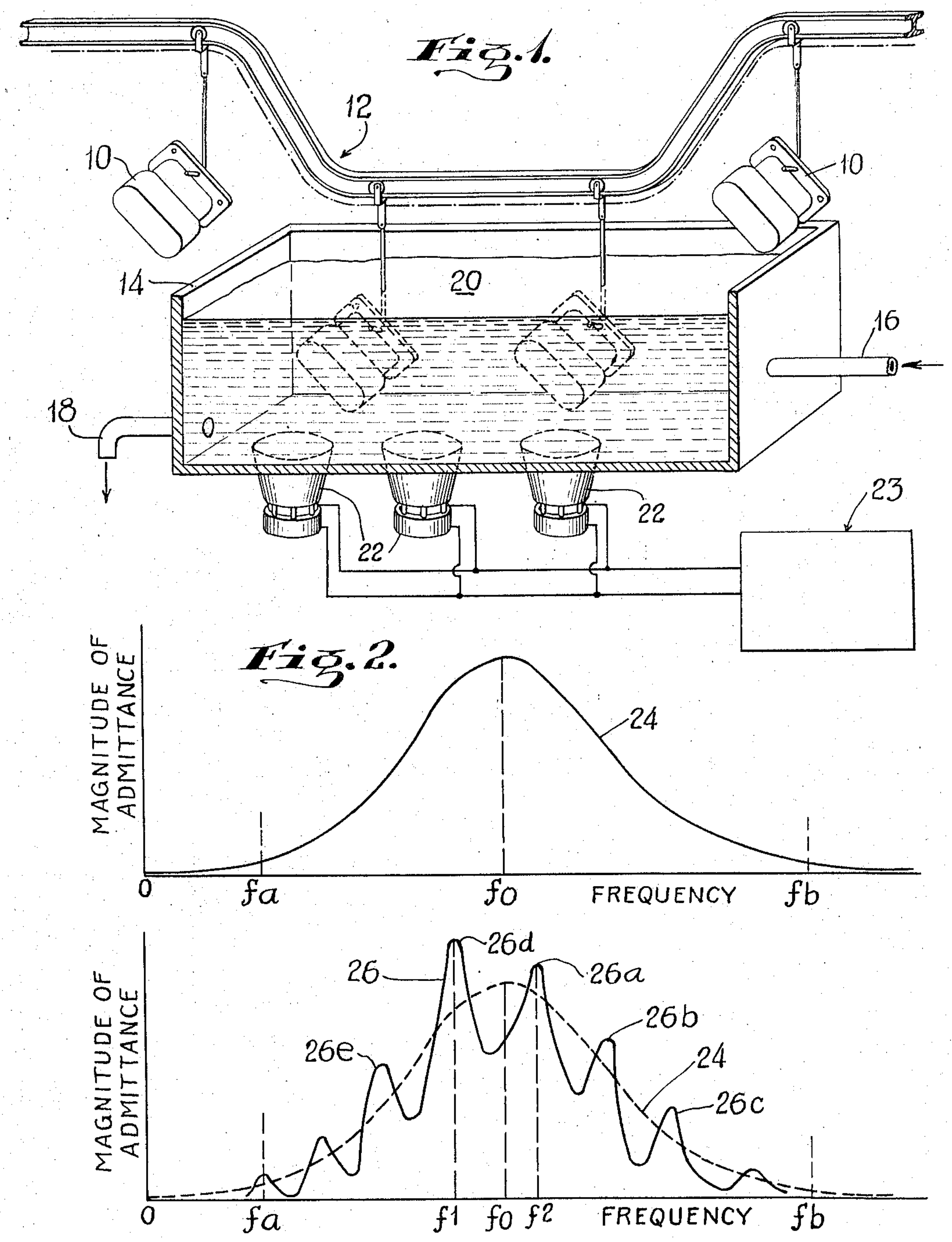
FIGURE 1 is a perspective view, partially in cross section and partially in schematic form, of ultrasonic cleaning apparatus according to the present invention.
FIGURE 2 is an idealized graph of the electrical admittance of the piezoelectric transducers shown in FIGURE 1 radiating into an infinite column of water, a socalled matched load, plotted as a function of the transducer excitation frequency.
FIGURE 3 is a simplified graph of the electrical admittance of the piezoelectric transducers shown in FIGURE 1 radiating ultrasonic energy into a column of liquid such as that shown in FIGURE 1 plotted as a function of the transducer excitation frequency.

Referring now to FIGURE 1, in an ultrasonic cleaning system according to the invention, articles 10 to be cleaned are carried on a conveyor 12 into an ultrasonic cleaning tank 14 suitably fitted with a liquid inlet pipe 16 and an outlet pipe 18. Electromechanical transducers 22 are suitably mounted on the outside of the tank 14 and are excited with an alternating voltage from an electrical supply 23 to radiate ultrasonic energy into a liquid 20 in the tank. A transducer suitable for ultrasonic cleaning is described in United States Patent No. 3,066,232. In the tank 14, the articles 10 are immersed in the liquid 20 for exposure to the ultrasonic energy radiated by the transducers. The resultant cavitation scrubs the surfaces of the articles clean.

The load into which each transducer 22 radiates ultrasonic energy includes the tank 14, the liquid 20, and the articles 10 in the liquid 20. As clean liquid is delivered to the tank through the inlet pipe 16 and spent liquid is removed via the outlet pipe 18, the quantity of liquid 20 loading the transducers 22 varies. The acoustic properties of the liquid in the tank 14 may also vary due, for example, to varying amounts of gas in the fresh liquid received at inlet pipe 16 and to varying amounts of dirt carried from the tank in the spent liquid removed at the outlet pipe 18. The transducer load also varies with the nature and number of articles 10 that are immersed in the tank.

In the graph of FIGURE 2, an idealized curve 24 shows the relative magnitude of the electrical admittance observed for an ultrasonic transducer 22 over a range of frequencies centered at the frequency where the loaded transducer has high electromechanical conversion efficiency. The curve 24 can also be considered as representing generally the amplitude of the ultrasonic signal when the transducer radiates into a load having no reflections; substantially infinite column of liquid in a tank would be one form of such an idealized load. At the frequency designated $f_0$, where the amplitude of the admittance has a maximum value, the amplitude of the ultrasonic energy radiated into the reflection-free load is a maximum.

When an ultrasonic transducer, such as the transducers 22 in FIGURE 1, radiates into a load having reflections, as encountered in most ultrasonic processes such as the cleaning system of FIGURE 1, the electrical admittance of the loaded transducer departs substantially from the curve 24 of FIGURE 2. Curve 26 in the graph of FIGURE 3 represents a typical admittance characteristic for such a loaded transducer 22. The curve 24 of FIGURE 2 is shown dashed in FIGURE 3 for comparison purposes.

The several peaks in the admittance curve 26 represent different resonance phenomena in the loaded transducer. As the transducer load varies, caused for example by changing the level of the liquid 20 in the tank 14 of FIGURE 1, the peaks on the curve 26 shift to different frequencies and change in amplitude. For example, as the liquid level rises in the tank 14 of FIGURE 1, the peaks of the admittance curve 26 shift to lower frequencies and become more numerous; the peaks 26*a*, *b*, and *c* move over the peak in the curve 24 to occur at lower frequencies. With continued increase in the liquid in the tank, the curve 26 will approach the curve 24.

When ultrasonic transducer 22 (FIGURE 1) is loaded to exhibit the admittance characteristic represented by the curve 26, at the frequency designated $f_1$, corresponding to the resonant peak 26*d* of maximum admittance, the transducer has high cleaning efficiency, radiating substantially maximum ultrasonic energy into the load. Accordingly, operation at the frequency $f_1$ is desired. When the transducer load changes to cause the peak 26*d* to shift to lower frequencies and decrease in amplitude, and to cause the peak 26*a* to shift closer to the peak of the curve 24, high cleaning efficiency is obtained at the frequency corresponding to the shifted peak 26*a*.

The present invention achieves this operation by automatically tuning the frequency of the alternating exciting voltage applied to the transducer. The tuned exciting voltage frequency decreases to remain equal to the frequency $f_1$ as the peak 26*d* is shifted to lower values by the changing transducer load. When the cleaning efficiency at the shifted peak 26*a* is markedly greater than at the shifted peak 26*d*, the transducer exciting frequency automatically "jumps" to the shifted frequency $f_2$ corresponding to the shifted peak 26*a*. An embodiment of the invention for automatically tuning the transducer exciting frequency in this manner is shown in FIGURE 4.

Figure 4:
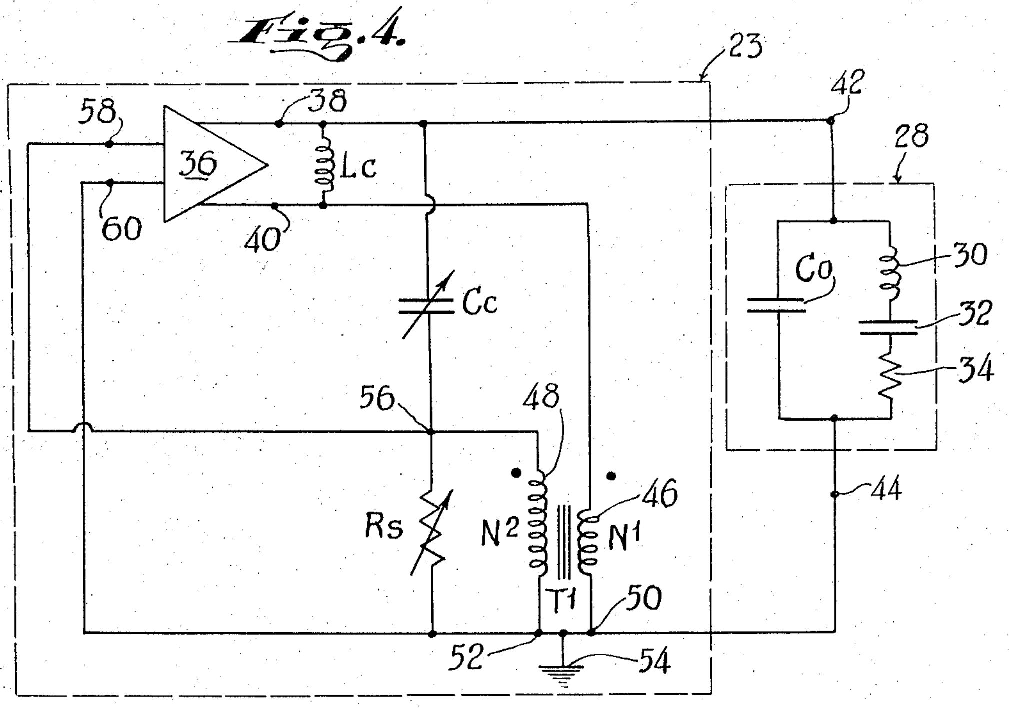
FIGURE 4 is a schematic diagram of a circuit for exciting a transducer according to the invention.

Referring now to FIGURE 4, a piezoelectric transducer, such as the ultrasonic transducers 22 of FIGURE 1, can be represented electrically by the equivalent circuit indicated generally at 28. The equivalent circuit 28 includes a load-invariant impedance component represented by a capacitor $C_0$ in parallel with a load-varying impedance component represented by an inductor 30, a capacitor 32, and a resistor 34 in series.

The series-connected inductor 30, capacitor 32, and resistor 34 correspond to the equivalent electrical impedance of the load into which the transducer is radiating ultrasonic energy.

The admittance curve 24 of FIGURE 2 corresponds to the admittance of the equivalent circuit 28 over the frequency range in which the load-varying impedance component is series resonant. The detailed equivalent circuit of a loaded transducer exhibiting the admittance characteristic of curve 26, FIGURE 3, is relatively complex and is not shown.

Referring further to FIGURE 4, an amplifier 36 develops an alternating voltage between its output terminals 38 and 40. The amplifier output voltage is applied through a primary winding 46 of a transformer T1 across transducer terminals 42 and 44 to excite the transducer, represented by the equivalent circuit 28, and causes it to generate ultrasonic vibrations.

A secondary winding 48 of the transformer T1 is inductively coupled with the primary winding 46. A summing resistor $R_s$, preferably variable as shown, is connected across the ends of the transformer secondary winding 48 between the terminals 52 and 56.

The transformer windings 46 and 48 are so coupled that the phase of the induced current in the secondary winding 48 is reversed, i.e. shifted 180°, with respect to the primary winding current. Thus, current directed into the primary winding 46 at terminal 50 induces a current directed out of the secondary winding 48 at the terminal 52.

An adjustable compensating capacitor $C_c$ is connected from the interconnected terminals 38 and 42 to the terminal 56. The capacitor $C_c$ is thus in series with the summing resistor $R_s$ and delivers to it a compensating current out of phase with respect to that portion of the induced current that the transformer T1 applies to the summing resistor in response to the current in the load-invariant capacitor $C_0$.

The maximum value of the summing resistor $R_s$ preferably conforms to the equation $$\frac{R_s}{(N2/N1)^2} \ll X(C_0) \qquad (1)$$

where $R_s$ is the maximum resistance of the summing resistor,
$N2/N1$ is the ratio of the number of secondary turns to the number of primary turns for the transformer T1, and
$X(C_0)$ is the reactive impedance of the capacitor $C_0$ over the operating frequency range.

For preferred operation, it is desirable that the term on right side of the equation be at least 10 times greater than left term. When this condition is satisfied, the current in the summing resistor from the compensating capacitor is substantially capacitive.

The primary winding terminal 50, remote from the amplifier output terminal 40, and the secondary winding terminal 52, remote from the compensating capacitor, are connected to a common return indicated at 54 as ground.

During operation, with the amplifier 36 developing an alternating exciting voltage between the output terminals 38 and 40, the total exciting current delivered by the amplifier to the transducer equivalent circuit 28 passes through the transformer primary winding 46. In response, the transformer T1 applies to the summing resistor $R_s$ an induced current that can be considered as comprising a load-invariant portion, proportional to the exciting current delivered to the load-invariant capacitor $C_0$ in the equivalent circuit 28, plus a load-varying portion proportional to the exciting current delivered to the load-varying impedance of the equivalent circuit 28.

When the compensating capacitor and the transformer T1 are selected and adjusted such that $$C_c = \frac{C_0}{N2/N1} \qquad (2)$$

where $C_c$ is the capacitance of the compensating capacitor $C_c$,
$C_0$ is the capacitance of the capacitor $C_0$ and
$N2/N1$ is the ratio of the member of secondary turns to the number of primary turns of the transformer T1;

the compensating current in the summing resistor $R_s$ cancels that portion of the induced current that corresponds to the exciting current delivered to the load-invariant impedance of the transducer. The net current in the summing resistor then corresponds in both phase and magnitude to the current in the load-varying impedance of the loaded transducer.

The relationship expressed in Equation 1 is readily obtained in the following manner. The transducer equivalent capacitor $C_0$ is the capacitance of the transducer measured at a frequency where the load-varying component of the transducer has a high impedance. It has been found that for a transducer with which the resonance indicated at $f_0$ (FIGURE 2) occurs in the vicinity of 25 kilocycles, the capacitor $C_0$ is suitably measured, using a reactance bridge, for example, at a frequency substantially lower than the frequency $f_0$, suitably at one kilocycle.

The transformer turns ratio ($N2/N1$) is selected to provide sufficient current in the summing resistor to produce a substantial feedback voltage between the terminals 56 and 52. The approximate value of the compensating capacitor $C_c$ is then computed from Equation 2. The circuit of FIGURE 4 is then assembled with a test capacitor, having the same capacitance as the measured value of the capacitor $C_0$, connected between the terminals 42 and 44 in place of the actual transducer. A test voltage is applied between the terminals 38 and 40. The frequency of the test voltage is preferably the same as the central operating frequency of the transducer, suitably the frequency indicated in FIGURE 2 at $f_0$. The compensating capacitor $C_c$ is then adjusted to provide minimum voltage across the summing resistor $R_s$.

Once the circuit of FIGURE 4 is adjusted in this manner, the compensating current in the summing resistor balances out the induced current that stems from the load-invariant impedance component of the loaded transducer.

In one cleaning system of the type shown in FIGURE 1 embodying the circuit of the invention shown in FIGURE 4, ten transducers constructed as described in United States Patent No. 3,066,232 are connected to be excited in parallel. The measured value of the capacitor $C_0$ for the ten parallel-connected transducers is 0.04 microfarad.

The system uses a transformer T1 having a secondary to primary turns ratio of 30:1. Hence, according to Equation 2, the value of the compensating capacitor $C_c$ is approximately 0.0013 microfarad. The system uses a 100 ohm summing resistor $R_s$.

With further reference to FIGURE 4, a compensating inductor $L_c$ is preferably connected between the amplifier output terminals 38 and 40 to balance out the capacitive current drawn from the amplifier by the capacitors $C_0$ and $C_c$. With the inductor $L_c$, the net current from the amplifier has a minimum reactive component, a desired operating condition.

It will thus be seen that with the circuit shown in FIGURE 4, the feedback voltage developed across the summing resistor $R_s$ provides an instantaneous indication of the value of the load-varying impedance of the loaded transducer. The feedback voltage can readily be used to automatically tune the frequency of the exciting voltage applied to the transducer between the terminals 38 and 40 to maintain continuous high cleaning efficiency according to the instantaneous value of the transducer load.

This automatic tuning operation is achieved by applying the feedback voltage developed across the summing resistor $R_s$ between the amplifier input terminals 58 and 60 to cause the circuit of FIGURE 4 to operate as a regenerative feedback oscillator. The oscillator operation is initiated and controlled by adjusting the amplitude of the feedback voltage applied to the amplifier input terminals 58 and 60. The feedback voltage amplitude is readily adjusted by changing the resistance of the summing resistor $R_s$; increasing the resistance increases the value of the feedback voltage.

For preferred operation, the amplifier 36 has a substantially constant response characteristic over the frequency range in which the transducer has high cleaning efficiency as the load varies between its operating limits. This frequency range is indicated in FIGURES 2 and 3 between the frequencies designated $f_a$ and $f_b$. The amplifier 36 preferably also has a uniform phase characteristic, ideally zero phase shift between its input and output voltages, over the same frequency range. For a transducer with which the resonance indicated in FIGURE 2 at $f_0$ occurs at around 25 kilocycles, the desired band width for the amplifier 36, between the frequencies indicated in FIGURE 2 as $f_a$ and $f_b$ may be as little as 10 kilocycles.

During operation, the regenerative feedback oscillator of FIGURE 4 oscillates when the feedback signal applied between the input terminals 58 and 60 is in phase with the amplifier output voltage, assuming an amplifier phase shift of zero as described above. The loop gain, or amplification from the amplifier input terminals to across the secondary winding 48, must be at least unity to sustain oscillation.

The amplitude of the feedback signal is proportional to the current in the load-varying component of the transducer equivalent circuit. During operation on the peaks of the admittance characteristic curve 26, FIGURE 3, the transducer draws a large exciting current due to the fact that the reactances of inductor 30 and capacitor 32 substantially cancel each other, the relative magnitude being proportional to the relative amplitude of the admittance peaks, and radiates considerably more ultrasonic energy into the cleaning system load than during operation off the peaks of the curve 26. Passage of this large current through the transformer primary winding 46 causes the feedback voltage across the summing resistor $R_s$ to have large amplitude. The resistor $R_s$ is generally adjusted so that the amplitude of the feedback signal is large enough to cause oscillation only at the few larger peaks, such as peaks **26*a*, 26*d* and possibly peak 26*b***.

The relative phase of the feedback signal required for oscillation is developed when the current in the load-varying component of the transducer equivalent circuit 28 is in phase with the exciting voltage applied between the transducer terminals 42 and 44. It has been found that when the loaded transducer has only a single large peak in its electrical admittance characteristic, similar to the single peak shown in the idealized curve 24 of FIGURE 2, the in-phase condition occurs at the frequency of the single peak. Accordingly, the oscillator automatically operates principally at the frequency associated with the single high peak. As stated above, this is a frequency of high cleaning efficiency, where large ultrasonic power is delivered to the cleaning tank.

As the transducer load changes, the reactances of inductor 30 and capacitor 32 no longer cancel each other at the same frequency of oscillation as before. The frequency at which the large admittance peak occurs shifts to a new value. The inductor 30 and capacitor 32 thus introduce a phase shift in the feedback loop such that the requisite in phase relationship between the feedback voltage at the input of amplifier 36 and the amplifier output voltage is no longer achieved. The frequency of oscillation of the circuit of FIGURE 4 automatically shifts to a frequency at which this requisite in phase relationship is achieved. The new frequency of oscillation is necessarily one at which the reactance of inductor 30 and capacitor 32 cancel each other, i.e., where the large peak of the drifted admittance curve occurs. In this manner, the transducer is continuously automatically excited at the frequency that provides high cleaning efficiency.

In many instances the admittance of the loaded transducer has a plurality of resonances, such as indicated by the peaks **26*a*, 26*b* and 26*d* in FIGURE 3, in the vicinity of the peak of the curve 24. However, it has been found that, with the feedback gain properly adjusted, the feedback information due to the load-varying component of the transducer current is sufficient in amplitude and has the proper phase to cause oscillation at one of the highest peaks, such as peak 26*a* or 26*d*, closest to the peak in the curve 24**. Thus, the illustrated regenerative feedback oscillator inherently oscillates at a frequency of high cleaning efficiency, such as the frequency indicated in FIGURE 3 as $f_1$.

Moreover, when two or more peaks on the admittance curve 26 of FIGURE 3 are relatively high, such as the two peaks **26*d* and 26*a*, the oscillator may intermittently operate at one resonance frequency and then at the other, that is, at the frequencies $f_1$ and $f_2$. However, the cleaning efficiency that occurs at the peak 26*a***, of frequency $f_2$, is substantially the same as at the frequency $f_1$, so that high cleaning efficiency is obtained at all times.

When the transducer load changes as described above, and the admittance resonance peaks as shown in FIGURE 3 shift, the frequency at which the oscillator of FIGURE 4 oscillates instantaneously shifts according to the change in the transducer load. As a result, the transducer is continuously automatically excited at the frequency that provides high cleaning efficiency.

With the circuit of FIGURE 4, substantially negligible transducer exciting power is consumed to produce the feedback voltage applied to the amplifier input. The series combination of the compensating capacitor and summing resistor present a high impedance to the amplifier, and the transformer primary winding inserts a small impedance in series with the transducer. Thus substantially all the amplifier output voltage is delivered to excite the transducer. The feedback voltage developed within the regenerative feedback oscillator, or automatically tuned source, of FIGURE 4 varies with respect to the voltage of the common ground terminal 54. Such a voltage is suited for direct application to an amplifier 36 having a grounded input terminal 60.

Figure 5:
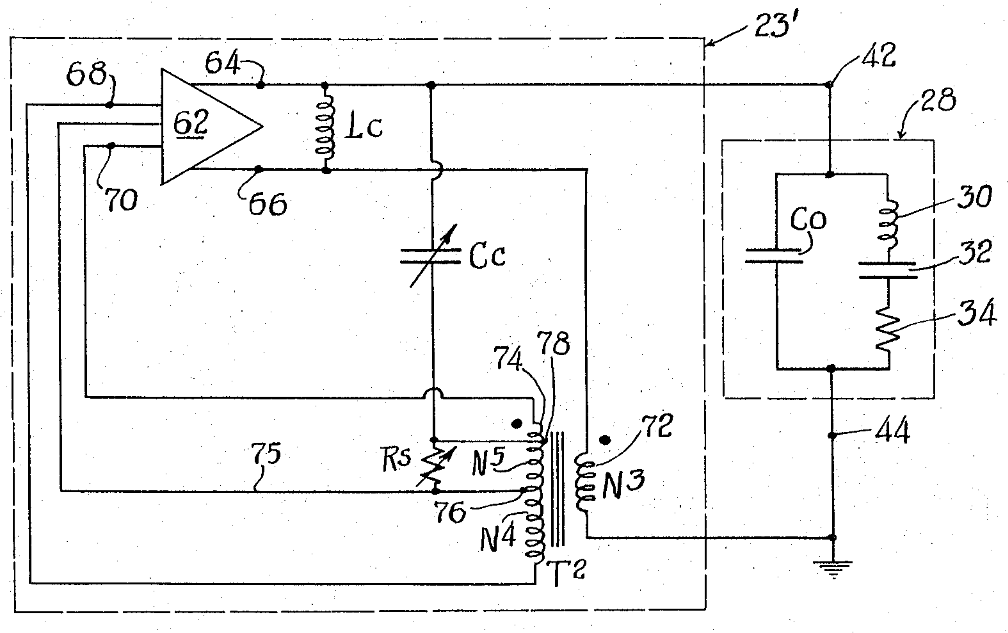
FIGURE 5 is a schematic circuit diagram similar to FIGURE 4 of another embodiment of the invention.

FIGURE 5 is a schematic diagram of an automatically tuned source using a push-pull amplifier 62 having output terminals 64 and 66 and input terminals 68 and 70. The push-pull amplifier 62 is designed to be driven by an input voltage, applied between its input terminals 68 and 70, that is symmetrical with respect to ground. Such a balanced feedback voltage can readily be developed in a manner similar to that described above with reference to FIGURE 4 in a circuit that differs from that shown in FIGURE 4 only in the use of a push-pull amplifier 62 and a transformer T2 having a center tapped secondary winding.

Accordingly, the loaded transducer is represented in FIGURE 5 as the equivalent circuit 28 connected between the transducer terminals 42 and 44. A primary winding 72 of the transformer T2 is connected between the amplifier output terminal 66 and the grounded terminal 44 to be in series with the transducer excitation. The secondary winding 74 of the transformer T2 is coupled with the primary winding 72 in the same manner as the windings 46 and 48 of the transformer T1 of FIGURE 4. The center tap 76 of the secondary winding 74 is suitably connected to a common return path indicated at 75, and the summing resistor $R_s$ is connected between the center tap 76 and an intermediate tap 78, also on the secondary winding 74. The resistor $R_s$ is thus in parallel with a portion of the secondary winding 74. The compensating inductor $L_c$ is also provided between the amplifier output terminals 64 and 66.

The compensating capacitor $C_c$ is connected from the connected terminals 64 and 42 to the intermediate tap 78 to be in series with the summing resistor.

When $$C_c = \frac{C_0}{N5/N3} \qquad (3)$$

where $C_c$ is the capacitance of the compensating capacitor $C_c$,
$C_0$ is the capacitance of the load-invariant capacitor $C_0$ of the transducer equivalent circuit 28,
N5 is the number of secondary winding turns of the transformer T2 between the taps 76 and 78, and
N3 is the number of primary winding turns in the transformer T2, the compensating current delivered to the summing resistor from the capacitor $C_c$ cancels that portion of summing resistor induced current derived from the transducer equivalent capacitor $C_0$.

The compensating current that the capacitor $C_c$ delivers to the summing resistor thus cancels the load-invariant portion of the induced current in the summing resistor and likewise cancels the load-invariant portion of the induced current in the transformer secondary winding.

As a result, the net voltage between the ends of the transformer secondary winding 74 corresponds in phase and magnitude to the portion of transducer exciting current delivered to the load-varying impedance, represented by the series connected inductor 30, capacitor 32, and resistor 34, in the transducer equivalent circuit 28. In this manner, a balanced feedback voltage is developed across the transformer secondary winding 74 of FIGURE 5. The balanced voltage corresponds to the unbalanced feedback voltage developed between the terminals 52 and 56 of the source of FIGURE 4.

The balanced feedback voltage can be applied to the input terminals 68 and 70 of the push-pull amplifier 62 to provide a regenerative feedback oscillator that operates in the same manner as the source of FIGURE 4 to automatically tune the frequency at which the transducer is excited for high cleaning efficiency.

With the transformer T2 shown in FIGURE 5, the ratio of secondary windings N4 to primary windings N3 can be fairly large, producing a large feedback signal. When desired, the resistor $R_s$ can be connected to the end of the secondary winding, eliminating the intermediate tap 78. The number of windings N5 in parallel with the resistor $R_s$ is then equal to half the number of secondary windings N4.

In summary, the invention described above provides novel circuits for automatically producing a feedback signal from transducers. The feedback signal is independent of the load-invariant impedance component of the transducer so that the signal corresponds in phase and magnitude to the current in the transducer's load-varying impedance component.

A feedback signal thus provided is readily used to provide a source of alternating voltage automatically tuned to the frequency at which the transducer has high cleaning efficiency.

These advantages are achieved with circuits that consume negligible power. Moreover, the amplitude of the feedback signal is readily adjustable by a single control. The relative phase of the feedback signal is unaffected when the amplitude is thus adjusted.

It will thus be seen that the objects set forth above, among those made apparent from the preceding description, are efficiently attained and, since certain changes may be made in the above constructions without departing from the scope of the invention, it is intended that all matter contained in the above description or shown in the accompanying drawings shall be interpreted as illustrative and not in a limiting sense.

It is to be understood, for example, that while the invention has been described as embodied in an ultrasonic cleaning system, it is equally applicable to sonic systems for mixing, homogenizing or emulsifying liquids, or for that matter to any electromechanical apparatus in which output transducers may be coupled to varying loads.

It is also to be understood that the following claims are intended to cover all of the generic and specific features of the invention which, as a matter of language, might be said to fall therebetween.

Having described the invention, what I claim as new and secure by Letters Patent is:

1. A circuit for connection to an electromechanical transducer to produce an electrical signal corresponding to the instantaneous load-varying component of the electrical impedance of the transducer, said circuit comprising in combination:

(A) compensating means for developing a first electrical signal corresponding to the load-invariant component of the electrical impedance of the transducer, (B) a transformer comprising a primary winding inductively coupled with a secondary winding, (1) said primary winding being connectable in circuit with the transducer so that said secondary winding produces a second electrical signal corresponding to the instantaneous total electrical impedance of the transducer; and, (C) an electrical summing network, (1) connected in circuit with said compensating means and with the secondary winding of said transformer, (2) said summing network subtracting said second electrical signal to produce an output electrical signal corresponding to the instantaneous load-varying component of the electrical impedance of the transducer.

2. Apparatus for producing an electrical signal corresponding to the load-varying component of the electrical impedance of a loaded energy-radiating, electromechanical transducer, said apparatus comprising in combination:

(A) compensating means for connection in circuit with alternating electrical excitation corresponding to the electrical excitation delivered to operate the transducer, (1) said compensating means developing a first electrical signal corresponding to the load-invariant component of the electrical impedance of the transducer;

(B) a transformer having a primary winding inductively coupled with a secondary winding, (1) said primary winding being connectable in circuit with alternating electrical excitation corresponding to the electrical excitation delivered to the transducer (a) to induce in said secondary winding a second electrical signal corresponding to the total electrical impedance of the transducer; and, (C) an electrical summing network connected in circuit with said compensating means and said transformer secondary winding and (1) receiving said first electrical signal in phase opposition to that portion of said second electrical signal derived from the load-invariant electrical impedance of the transducer, (2) said first electrical signal cancelling in said summing network the portion of said second electrical signal corresponding to the load-invariant electrical impedance of the transducer, (3) said summing network producing a net signal corresponding to the load-varying electrical impedance of said transducer.

3. The apparatus defined in claim 2 in which:

(A) said compensating means is connected in series with said summing network; and, (B) the series combination of said compensating means and said summing network is connectable in parallel with the electrical excitation applied to operate the transducer, (1) so that said compensating means receives electrical excitation in phase with the electrical excitation delivered to the transducer.

4. The apparatus defined in claim 2 in which:

(A) said compensating means comprises a capacitor; and, (B) said summing network comprises a resistor connected in series with said capacitor.

5. Apparatus for connection with an ultrasonic energy producing electric transducer for developing a feedback signal corresponding to the electrical excitation delivered to the load-varying component of the transducer's electrical impedance, said apparatus comprising in combination:

(A) compensating means developing a compensating current corresponding to the electrical excitation delivered to the load-invariant component of the electrical impedance of the transducer;

(B) an inductive winding (1) connectable in circuit to receive alternating electrical excitation corresponding to the total excitation delivered to the transducer, and (2) developing in response thereto an induced current corresponding to the total exciting current in the transducer; and, (C) current summing means connected in circuit with said compensating means and said winding to receive said compensating circuit and said induced current, (1) said compensating current cancelling in said current summing means the portion of said induced current corresponding to the electrical excitation delivered to the load-invariant component of the transducer's electrical impedance, (2) so that said feedback signal corresponds to the net current in said summing network.

6. In an ultrasonic cleaning system wherein an electric transducer excited with an alternating voltage radiates ultrasonic energy into a celaning tank filled with liquid in which material is ultrasonically cleaned, a circuit for producing an electrical monitoring signal corresponding to the load-varying component of the electrical impedance of the transducer and comprising in combination:

(A) compensating means for connection in circuit with alternating electrical excitation in phase with the alternating voltage exciting the transducer, (1) said compensating means developing a first electrical signal corresponding to the exciting current delivered to the load-invariant components of electrical impedance of the transducer;

(B) coupling means having output terminals, (1) said coupling means being connected in circuit with said transducer and receiving at least a portion of the electrical excitation delivered to the transducer and, (2) developing between said output terminals in response thereto a second electrical signal corresponding to the instantaneous value of the total exciting current delivered to the transducer; and, (C) an electrical summing network connected in circuit with said compensating means and said coupling means to receive said first and second signals with that portion of said second signal that is derived from the load-invariant transducer electrical impedance component being in phase opposition to said first signal, (1) said first electrical signal cancelling in said summing network the portion of said second electrical signal corresponding to the exciting current delivered to the load-invariant electrical impedance of the transducer, and (2) said summing network producing said monitoring signal corresponding to the uncancelled portion of said second electrical signal.

7. An electrical circuit for connection with an electric transducer excited with an alternating voltage for radiating ultrasonic energy into a varying load said circuit producing a feedback signal corresponding to the instantaneous value of the electrical excitation delivered to the transducer's load-varying component of electrical impedance and comprising in combination:

(A) first and second terminals for connection across the transducer;

(B) an adjustable capacitor;

(C) a summing resistor connected in series with said capacitor between said first and second terminals;

(D) a third terminal; and (E) a transformer having a primary winding inductively coupled with a secondary winding, (1) said primary winding being connected between said second and third terminals to receive the transducer exciting current applied between said first and third terminals, (2) said secondary winding being connected in parallel with said summing resistor and (a) delivering to said summing resistor an induced current corresponding to the transducer exciting current, (3) said capacitor and said transformer being so constructed that the current said capacitor delivers to said resistor cancels that portion of the induced current in said resistor derived from the load-invariant component of the electrical impedance of the transducer, (4) so that said feedback signal is the net voltage across said summing resistor.

8. The circuit defined in claim 7 for connection with a transducer whose electrical impedance can be represented with a load-varying component in parallel with a load-invariant capacitor, (A) in which $$C_c=\frac{C_0}{N2/N1}$$

where, $C_c$ is the capacitance of said compensating capacitor, $C_0$ is the capacitance of said load-invariant capacitor, and $N2/N1$ is the ratio of the secondary to primary turns in said transformer.

9. The circuit defined in claim 7, further comprising an inductor connected between said first and third terminals for balancing the reactive current in said compensating capacitor and in said transducer.

10. An electrical circuit for connection with an electric transducer excited with an alternating voltage for radiating ultrasonic energy into a varying load, said circuit producing a balanced feedback signal corresponding to the instantaneous value of the electrical excitation delivered to the transducer's load-varying component of electrical impedance and comprising in combination:

(A) first and second transducer terminals for connection in circuit with a source of alternating electrical excitation for applying the excitation to the transducer;

(B) a third terminal;

(C) an adjustable capacitor connected at one end to said first terminal;

(D) a summing resistor connected in series between the second end of said capacitor and said third terminal;

(E) a transformer having a primary winding inductively coupled with a secondary winding, (1) said primary winding being connected to said second terminal for connection in series with the transducer to receive the transducer exciting current applied between said first and second transducer terminals, (2) said secondary winding having a center tap connected to said third terminal, (3) said secondary winding being further connected with said summing resistor so that a portion of said secondary winding is parallel with said resistor, and (a) delivering to said summing resistor an induced current corresponding to the transducer exciting current, (4) said capacitor and said transformer being so constructed that the current said capacitor delivers to said resistor cancels that portion of the induced current in said resistor derived from the load-invariant component of the electrical impedance of the transducer, (5) so that said feedback signal is the net voltage across said secondary winding.

11. The circuit defined in claim 10 for connection with a transducer whose electrical impedance can be represented with a load-varying component in parallel with a load-invariant capactior and in which:

(A) said transformer secondary winding has an intermediate tap connected to the other end of said summing resistor; and (B) $$C_c=\frac{C_0}{N5/N3}$$

where, $C_c$ is the capacitance of said compensating capacitor, $C_0$ is the capacitance of said load-invariant capacitor, $N5/N3$ is the ratio of the number of transformer secondary turns between said intermediate and center taps to the number of transformer primary turns.

12. An electrical source for exciting an electro-mechanical transducer to radiate mechanical energy into a load said source comprising in combination:

(A) electrical amplifying means operative over the range of frequencies in which the transducer has optimum operation as the load varies between its operating limits,
   (1) said amplifier means having output terminals and input terminals;
(B) transducer-receiving terminals connected in circuit with said amplifier output terminals for exciting the transducer with the output voltage from said amplifier means;
(C) compensating means connected in circuit with said amplifier output terminals and,
   (1) producing a compensating signal corresponding to the electrical excitation delivered to the load-invariant component of the electrical impedance of the transducer;
(D) feedback means connected in circuit with said terminals and with said amplifier output terminals,
   (1) said feedback means comprising a transformer having an output portion and
      (a) developing in said output portion a second signal corresponding to the total electrical excitation delivered to the transducer,
   (2) said feedback means being connected in circuit with said compensating means and
      (a) combining said second signal with said compensating signal to produce a feedback signal corresponding to the instantaneous value of the load-varying component of the electrical impedance of the transducer,
   (3) said feedback means being connected in circuit with said electrical amplifier means to deliver said feedback signal to said amplifier input terminals,
      (a) with sufficient amplitude and a selected relative phase so that said source operates as a regenerative feedback oscillator developing between said amplifier output terminals a voltage alternating at a frequency responsive to the value of the transducer load.

13. An electrical circuit for connection to excite a transducer to radiate mechanical energy into a load, said circuit automatically tuning the transducer exciting frequency according to changes in the transducer load and comprising in combination (A) an electrical amplifier operative over a selected range of frequencies,
   (1) said amplifier having output terminals and input terminals;
(B) first and second terminals for connection in circuit with the transducer for exciting it with the output voltage from said amplifier;
(C) compensating means for developing a first electrical signal corresponding to the load-invariant component of the electrical impedance of the transducer;
(D) a transformer having a primary winding inductively coupled with a secondary winding,
   (1) said primary winding being connectable in circuit with the transducer to produce a second electrical signal corresponding to the total electrical impedance of the transducer; and
(E) an electrical summing network
   (1) connected in circuit with said compensating means and with the secondary winding of said transformer,
   (2) said summing network subtracting said first electrical signal from said second electrical signal to produce a feedback signal corresponding to the load-varying component of the electrical impedance of the transducer,
   (3) said summing network being connected in circuit to apply said feedback signal to said amplifier input terminals to cause said amplifier to oscillate at a frequency that is within said selected range and this is responsive to the instantaneous value of the transducer load.

14. The circuit defined in claim 13 in which:

(A) said compensating means is connected in series with said summing network; and
(B) the series combination of said compensating means and said summing network is connected in parallel with the electrical excitation applied to operate the transducer,
   (1) so that said compensating means receives electrical excitation in phase with the electrical excitation delivered to the transducer.

15. A circuit for connection to an electric transducer to cause the transducer to radiate ultrasonic energy into a varying load, said circuit automatically tuning the frequency of the transducer excitation to obtain high performance in the transducer according to changes in the load and comprising in combination:

(A) an electrical amplifier having a substantially flat response characteristic over the frequency range at which the transducer has high performance as the load varies between its operating limits,
   (1) said amplifier having input terminals and output terminals;
(B) first and second terminals for connection with the transducer to apply the amplifier output voltage to the transducer;
(C) an adjustable capacitor;
(D) a summing resistor connected in series with said capacitor,
   (1) the series combination of said capacitor and said resistor being connected in circuit to receive a portion of the alternating excitation said amplifier applies to the transducer; and
(E) a transformer primary winding connected between said amplifier output terminals and one of said first and second terminals to receive the transducer exciting current applied between said first and second terminals; and
(F) a transformer secondary winding inductively coupled with said primary winding,
   (1) at least a portion of said secondary winding being connected in parallel with said summing resistor, and
      (a) delivering to said summing resistor an induced current responsive to the transducer exciting current,
      (b) that portion of the induced current in said resistor that is derived from the load-invariant electrical impedance of the transducer being in phase opposition to the current said compensating capacitor delivers to said resistor, (2) said capacitor and said transformer windings being so constructed that the compensating capacitor current in said resistor cancels that portion of the induced current in said resistor derived from the load-invariant component of the electrical impedance of the transducer, (3) said secondary winding being connected in circuit with said amplifier, and (a) applying to said amplifier input terminals an electrical signal corresponding to the instantaneous value of the load-varying component of electrical impedance of the transducer.

16. A transducer exciting circuit comprising in combination:

(A) a piezoelectric transducer for coupling with an ultrasonic cleaning tank to radiate ultrasonic energy into the tank;

(B) an adjustable compensating capacitor;

(C) a summing resistor (1) connected in series with said compensating capacitor, (2) the series combination of said capacitor and said resistor being connected in circuit with said transducer to receive a portion of the electrical excitation applied to said transducer;

(D) a transformer having a primary winding inductively coupled with a secondary winding, (1) said primary winding being connected in series with said transducer and inducing in said secondary winding an induced current corresponding to the total electrical impedance of said transducer, (2) said secondary winding being connected in parallel with said resistor, (3) said capacitor and said transformer being so constructed that the current in said resistor from said capacitor cancels that portion of the induced current in said resistor derived from the load-invariant component of the electrical impedance of said transducer; and (E) an amplifier operative over a selected range of frequencies centered about the frequency at which said transducer has high cleaning efficiency, (1) output terminals on said amplifier connected in circuit to excite said transducer, (2) input terminals on said amplifier connected in circuit with said secondary winding, (3) said amplifier receiving from said secondary winding an electrical signal corresponding to the electrical excitation delivered to the load-varying component of the electrical impedance of said transducer, (4) said amplifier oscillating in response to the electrical signal from said secondary winding at the frequency at which said transducer has high cleaning efficiency.

17. A transducer exciting circuit comprising in combination:

(A) a piezoelectric transducer for coupling with an ultrasonic cleaning tank to radiate ultrasonic energy into the tank;

(B) an adjustable compensating capacitor;

(C) a summing resistor (1) connected in series with said compensating capacitor, (2) the series combination of said capacitor and said resistor being connected in circuit with said transducer to receive a portion of the electrical excitation applied to said transducer;

(D) a transformer having a primary winding inductively coupled with a center-tapped secondary winding, (1) said primary winding being connected in series with said transducer and inducing in said secondary winding an induced current corresponding to the total electrical impedance of said transducer, (2) at least a portion of said secondary winding being connected in parallel with said resistor (a) one connection between said secondary winding and said resistor being made at the center tap of said secondary winding, (3) said capacitor and said transformer being so constructed that the current in said resistor from said capacitor cancels that portion of the induced current in said resistor derived from the load-invariant component of the electrical impedance of said transducer; and (E) an amplifier operative over a selected range of frequencies centered about the frequency at which said transducer has high cleaning efficiency, (1) output terminals on said amplifier connected in circuit to excite said transducer, (2) input terminals on said amplifier connected in circuit with said secondary winding, (3) said amplifier receiving from said secondary winding a balanced electrical signal corresponding to the electrical excitation delivered to the load-varying component of the electrical impedance of said transducer, (4) said amplifier oscillating in response to the electrical signal from said secondary winding at the frequency at which said transducer has high cleaning efficiency.

18. The circuit defined in claim 8 in which $$\frac{R_s}{(N2/N1)^2} \ll X(C_0)$$

where $R_s$ is the maximum resistance of the summing resistor, $N2/N1$ is the ratio of the number of secondary turns to the number of primary turns for the transformer T1, and $X(C_0)$ is the reactive impedance of the capacitor $C_0$.

No references cited.

MILTON O. HIRSHFIELD, *Primary Examiner.*

A. J. ROSSI, *Assistant Examiner.*